Patented Jan. 13, 1953

2,625,544

UNITED STATES PATENT OFFICE 2,625,544

PREPARATION OF AMMONIUM PENICILLIN

Erwin Schwenk and Gerhard Adalbert Fleischer, Montclair, N. J., assignors, by mesne assignments, to the Attorney General of the United States No Drawing. Application January 6, 1942, Serial No. 425,746

4 Claims. (Cl. 260—239.1)

The present invention relates to the manufacture of concentrated and purified preparations of penicillin and its inorganic and particularly its ammonium salts.

It is known from the work of Fleming (British Jour. of Exp. Pathology 10 (1929) pages 226–236), Chain and others (Lancet August 24, 1940, pages 226–228), that the cultures of certain molds of the type of penicillium notatum and penicillium chrysogenum, contain a principle which is able to suppress the growth of pathogenic organisms such as staphylococci, streptococci, and clostridium, and which, therefore, is suitable for the treatment of infections by these organisms in human beings, if such principle could be isolated in adequately pure form. Although the first observations on the bacteriostatic action of the cultures of these molds were made more than a decade ago, very little, if anything, has been added in the meantime to our knowledge thereof, nor has any procedure been suggested for isolating the active principle in an adequately stable form and in a condition in which it can be employed in human therapy. So far as we are aware, the early investigators were not able to do more than isolate a crude brownish powder of changing activity.

It is a general object of the invention to produce highly purified concentrates of the antibacterial principle or principles of molds yielding such principles, and particularly of molds of the penicillin group, and also salts of such active substance or substances, and particularly the anhydrous ammonium salt, whereby such anti-bacterial agents may be utilized in the treatment of infections and diseases in human beings.

We have found that with the aid of certain organic liquids a very efficient extraction and isolation of the active anti-bacterial principle of the mold cultures referred to above can be obtained. We have found further that it is possible to isolate the active principles in a highly purified and at the same time quite stable form by making use of the acidic properties of the active substance or substances developed in the culture media by converting such substances into their inorganic salts, and particularly the ammonium salt under anhydrous conditions. Whereas the known salts of the acidic active material or materials when prepared in the usual way are liable to decompose easily, and the active substance cannot readily be isolated therefrom in the dry form, relatively stable inorganic and especially ammonium salts can, as we have found, be obtained if their preparation is carried out with exclusion of water. The dry salts so obtained are stable substances which can be preserved for quite some time and which, when dissolved, can be used for therapeutic purposes. These anhydrous salts may, moreover, be employed for further purification of the active principle as the latter, after the isolation of the salts and re-solution in a solvent, followed by decomposition of the salts with an acid, can be extracted with an organic solvent from which the active principle may be precipitated by means of an aliphatic hydrocarbon, such as petroleum ether, or in the form of even more highly purified inorganic salts. In this procedure the salts are formed by combining the active principle, preferably in the form of a solution in an organic solvent, with a dry base under anhydrous conditions, such as sodium bicarbonate, magnesium oxide, dry ammonia gas, or other inorganic bases.

A satisfactory procedure, which is given by way of example, consists in the extraction of the active principle from the culture medium in the usual way as described by the first investigators and then treating this solution with a base to form the salt. For instance, the culture medium, after eliminating the mold by filtration, is acidified and then extracted with a more or less water-immiscible organic solvent, such as butyl alcohol, benzene, or chloroform, and this solution in the organic solvent is then treated with a basic substance, for instance, by shaking it with magnesium oxide, or by passing dry ammonia through the solution. In the first case, the magnesium oxide will adsorb the acidic active principle which may then be isolated from the dry powder by acidification and extraction with the same solvent as used before. In the case that ammonia is used, the dry ammonium salt will precipitate.

This method of precipitating the acidic active principle in the form of a dry salt may be used several times to accomplish a higher degree of purification, and the solution to be used for precipitation of the salts may further be purified before precipitation of the salt by re-extracting the solution in an organic solvent with a buffer solution, whereby the active principle goes into the aqueous buffer solution, the latter being at a pH of 6 or higher. From this buffer solution the active principle is freed by acidification and re-extraction with an organic solvent. The active principle is obtained in the organic solvent solution from which it may then be precipitated as a salt, for instance the ammonium salt, by the method described above. Other preliminary purification methods may be used, such as first adsorption on adsorbents like fuller's earth, or similar substances, or the active principle may first be precipitated from the original extraction by the use of an organic solvent in which it is not soluble, as described hereinafter.

The following examples are presented to illustrate various procedural modifications in accordance with the invention but are not to be understood as indicating the limits of the invention.

Example 1

Seventeen liters of culture fluid are filtered through glass wool and then cooled externally with ice water. The pH is adjusted with 5-$n$ $H_2SO_4$ to between 4 and 5 and the solution is saturated with ammonium sulfate. To this solution 5.7 liters of chloroform are added and the mixture is stirred in an ice bath for 1 hour. The emulsion is transferred to separatory funnels and is separated, after ten minutes, into the creamy lower layer and the aqueous upper layer. The lower layer is cleared by filtration through a layer of glass wool of about 8-inch thickness covered by a layer of ammonium sulfate. This filtration results in a clear-cut and rapid separation of the two phases. The combined aqueous solutions are once more extracted with 5.7 liters of chloroform for 1 hour. The combined chloroform extractions are dried with sodium sulfate and concentrated in vacuo to about 100 cc.

The yellow-brown solution is transferred to a separatory funnel and extracted ten times with a total of about 1200 cc. of ice cold M/5 phosphate buffer of pH 7.2. All the penicillin activity goes into the buffer solution which is now titrated with 5-$n$ sulfuric acid until the first permanent turbidity appears. It is saturated with ammonium sulfate and extracted twice with chloroform. A third chloroform extraction is made after further acidification with about 10 cc. of 5-$n$ sulfuric acid. The combined chloroform extracts are dried with sodium sulfate and concentrated in vacuo to about 5 cc. This concentrate is transferred with another 5 cc. of chloroform to a 250 cc. centrifuge cup. Ninety cc. of dry benzene are added and the clear mixture is cooled in an ice mixture. Dry ammonia gas is passed in for a few minutes. The solution turns brown and the flocculent precipitate is centrifuged immediately. The supernatant solution is clear and contains no activity. The precipitate is washed by stirring with cold petroleum ether, is then separated in a centrifuge, and dried in a vacuum desiccator.

The yield varies between 60–120 mg. The material contains a total of about 5–7% nitrogen, of which about 2.3% are ammonium nitrogen. It is active in a concentration of 1:16,000,000–32,000,000, when tested with 2–3,000,000 of a 16 hour culture of a group A hemolytic streptococcus. By the same method, the starting material has an activity of 1:320–640.

Example 2

Seventeen liters of culture fluid containing penicillin are extracted with chloroform, as described in Example 1. The chloroform concentrate, measuring about 100 cc., is then poured into 10 times its volume of petrol ether. The resulting precipitate is separated by centrifuging. It is subsequently dissolved in 100 cc. of benzene and the insoluble matter discarded.

From this benzene solution, the active material is extracted with phosphate buffer of pH 7.2, as described in Example 1. After the buffer has been acidified with dilute sulfuric acid as above, the active material is extracted with chloroform. The chloroform solution is again concentrated in vacuo to a volume of about 5 cc. and diluted with nine parts of benzene. Dry ammonia gas is passed through and the resulting precipitate is immediately separated by centrifuging; it is then washed with petrol ether and dried in a desiccator.

Example 3

Six liters of culture fluid are extracted with chloroform, as described in Examples 1 and 2. The chloroform, after drying, is then treated with magnesium oxide, which adsorbs practically the whole of the active material.

The magnesium oxide is decomposed with 1 liter of dilute sulfuric acid while being cooled. The mixture is then extracted 4 times with 100 cc. of chloroform each. The combined chloroform layers are washed with water, dried, and concentrated in vacuo to about 10 cc. Ninety cc. of benzene are added and an ammonium salt is prepared by passing through dry ammonia gas, as described in the preceding examples.

Example 4

11.1 liters of penicillin broth are adjusted to pH 6. Then, 5.55 liters of denatured alcohol and 2.22 liters of butyl alcohol are added, and this is shaken up by hand. Separation of two layers is accomplished by saturating the mixture with ammonium sulfate. The water layer is extracted for the second time with butanol, 3.68 liters being used. Both extracts are combined and dried over sodium sulfate. The solvents are then removed by distillation in vacuo. The dry residue is dissolved in 100 cc. of absolute alcohol. This is poured into 1 liter of benzene which has been dried over calcium chloride. A brownish residue comes out which is filtered off and discarded. The filtrate is brought to dryness in vacuo and the resulting residue is taken up in 50 cc. of dry ether. The active material is then precipitated with 2 grams of magnesium oxide. The magnesium oxide is separated by filtration and is then decomposed with 100 cc. of 2-$n$ sulfuric acid. It is subsequently extracted 3 times with 20 cc. of chloroform each time. The combined chloroform extracts are dried with sodium sulfate and poured into 10 times its volume of petrol ether. The precipitate is separated in the centrifuge and washed with petrol ether. It is finally dried in the desiccator.

As is indicated by the above examples, the formation of salts is carried out in the absence of water, as we have found that the salts are as a rule not stable in the presence of water, and in basic aqueous media generally.

The chloroform employed by us for the extraction of the active principles is superior in many respects to the extraction agents heretofore suggested. Moreover, by the addition of an aliphatic hydrocarbon like benzine or the like, a highly purified material can be precipitated from the chloroform solution.

The phosphate buffer employed in the above examples may be prepared by combining M/5 dibasic sodium phosphate solution with M/5 monobasic potassium phosphate solution in proper proportions to yield the desired pH value. For best results the buffer should have a pH of about 6 to 8. Other buffer solutions which can be adjusted to this range may be employed.

The penicillin extract, either in the form of the free acidic active material or in the form of its anhydrous inorganic, and especially ammonium, salts can be employed in the treatment of infections both orally and parenterally and also on open wounds. It has proved to be especially effective in cases of severe streptococcal infections. The penicillin and its salts can be injected intramuscularly, intravenously or subcutaneously. As penicillin itself is of a lipoid character, it may be used therapeutically in the form of an oily solution or suspension, the common fatty oils used for similar purposes being quite suitable.

The addition of ammonium sulfate to the culture fluid aids greatly in the efficient extraction of the active principle by the chloroform or equivalent water-immiscible organic solvent. Practically any soluble salt can be used to serve a similar purpose, for example, ammonium chloride, sodium chloride, and in general any salt which aids in diminishing the solubility of the penicillin and desirably also of the chloroform in water. The sulfuric acid employed in Example 1 for adjusting the pH value can in turn be replaced by hydrochloric, phosphoric, and other acids, inorganic or organic, which have no chemical action on the organic materials present in the culture fluid. For this reason nitric acid is not suitable. We have found that chloroform yields extracts of the highest concentration of active material with correspondingly lower proportions of inert material than does, for example, ether. The chloroform extracts of the present invention have yielded products of the greatest purity and highest activity.

The extraction of the culture medium is preferably carried out when the batch or culture is most active, as has been described in the literature. The time at which maximum activity occurs depends upon many factors, including the type of broth, size of the batch, temperature of incubation, etc.

The free penicillin of the present invention is sensitive to alkalies, rapidly losing its activity at alkaline pH values. It is soluble in water at a pH value of 6 and above, being only slightly soluble at a pH value below 6. On the other hand, it is very soluble in alcohol.

We claim:

1. Process for the extraction of penicillin from culture media containing the same, comprising filtering the culture medium, acidifying the same and saturating the liquid with a soluble salt, extracting the mixture with chloroform, treating the chloroform extract with a buffer solution capable of maintaining the pH value between 6 and 8, acidifying the buffer extract and saturating the same with a soluble salt, extracting the mixture with chloroform, drying and concentrating the chloroform extract, adding dry benzene thereto, introducing dry ammonia gas into the mixture and separating the ammonium salt of penicillin.

2. Process for the manufacture of bacteriostatic substances from penicillin cultures, comprising dissolving the active material of said cultures in an anhydrous organic solvent, reacting said solution with ammonia gas under anhydrous conditions, and separating the salt so formed.

3. Process for the extraction of penicillin from culture media containing the same comprising extracting the culture medium with chloroform, extracting the chloroform solution with an aqueous buffer solution in the lower alkaline range, acidifying the extract and extracting it with a water-immiscible organic solvent for penicillin which is miscible with benzene, adding a number of volumes of benzene to the solution, leading enough dry ammonia gas into the organic solution to form the ammonium salt, and separating the precipitated salt and drying the same under vacuum.

4. Process according to claim 2, wherein the organic solvent is chloroform.

ERWIN SCHWENK.
GERHARD ADALBERT FLEISCHER.

REFERENCES CITED

The following references are of record in the file of this patent:

UNITED STATES PATENTS

| Number | Name | Date |
| --- | --- | --- |
| 1,985,217 | Schonle | Dec. 18, 1934 |
| 1,996,629 | Schonle | Apr. 2, 1935 |

OTHER REFERENCES

Dale: "Nature," Dec. 9, 1944; vol. 154, pp. 724–726.

Clutterbuck: "Metabolic Products of Penicillin," pp. 1450–1451, Biochemical Journal (1932) (2), London.

The Biochemical Journal (2), Feb. 1942, Chain p. 5.

The Biochemical Journal (2), (1932), p. 1918.

Lancet, 2: 762, Dec. 20, 1941.

Lancet, 2: 178–180, Aug. 16, 1941, Abraham.